US010180212B2

(12) United States Patent
Harper

(10) Patent No.: US 10,180,212 B2
(45) Date of Patent: Jan. 15, 2019

(54) METHOD AND SYSTEM FOR CONTROLLING FLUID FLOW FROM A STORAGE TANK THROUGH A SUPPLY LINE TO AN END USER

(71) Applicant: Westport Power Inc., Vancouver (CA)

(72) Inventor: Gregory C. Harper, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 384 days.

(21) Appl. No.: 13/729,466

(22) Filed: Dec. 28, 2012

(65) Prior Publication Data

US 2013/0104997 A1    May 2, 2013

Related U.S. Application Data

(63) Continuation-in-part of application No. 12/414,436, filed on Mar. 30, 2009, now abandoned.

(51) Int. Cl.
*F17D 3/01* (2006.01)
*F16K 17/04* (2006.01)
(Continued)

(52) U.S. Cl.
CPC ............ *F17D 3/01* (2013.01); *F02D 19/022* (2013.01); *F02M 21/0209* (2013.01);
(Continued)

(58) Field of Classification Search
CPC ........... F02M 21/0215; F02M 21/0242; F02M 21/0239; F02M 21/0275; F02M 21/023;
(Continued)

(56) References Cited

U.S. PATENT DOCUMENTS 3,511,270 A * 5/1970 Muller ................... F02M 69/54
137/510
3,763,840 A * 10/1973 Schimmelpfenig ........... 137/469
(Continued)

FOREIGN PATENT DOCUMENTS

CA        2362881 A     2/2002

OTHER PUBLICATIONS

Whitesides, Randall W. "Selection and Sizing of Pressure Relief Valves." 2012. PDH Online. Accessed: Dec. 23, 2016. <http://www.pdhonline.com/courses/m112/Selection%20and%20Sizing%20of%20Pressure%20Relief%20Valves.pdf>.*
"The Basics of Pressure Regulators" by Beswick Engineering Co., Inc. of Greenland, NH (downloaded Jun. 26, 2017 from http://www.beswick.com/basics-pressure-regulators).

*Primary Examiner* — Mahmoud Gimie
*Assistant Examiner* — Josh Campbell
(74) *Attorney, Agent, or Firm* — Carie C. Mager; C. Larry Kyle

(57) ABSTRACT

A method and a system control flow of fluid from a storage tank through a supply line to an end user. The system includes a valve that in its open position allows fluid flow from the storage tank to the end user and closes when the pressure in the fluid supply line drops below a predetermined set point. The storage tank is thereby isolated because the valve prevents fluid from flowing from the storage tank to the supply line when the pressure in the supply line is lower than a predetermined upper limit of the storage tank pressure. An end use that is particularly suited to the present system and method is a fuel storage and supply system for a natural gas powered internal combustion engine.

20 Claims, 4 Drawing Sheets

(51) Int. Cl.
*F02D 19/02* (2006.01)
*F02M 21/02* (2006.01)
*F02D 19/06* (2006.01)
*F02M 69/54* (2006.01)

(52) U.S. Cl.
CPC .......... *F16K 17/04* (2013.01); *F02D 19/0673* (2013.01); *F02D 19/0678* (2013.01); *F02D 19/0681* (2013.01); *F02M 21/023* (2013.01); *F02M 21/0215* (2013.01); *F02M 21/0239* (2013.01); *F02M 21/0242* (2013.01); *F02M 69/54* (2013.01); *F02M 2200/31* (2013.01); *F02M 2200/315* (2013.01); *Y02T 10/32* (2013.01); *Y10T 137/0379* (2015.04); *Y10T 137/7837* (2015.04); *Y10T 137/7922* (2015.04)

(58) Field of Classification Search
CPC ............... F02M 69/54; F02M 2200/31; F02M 2200/315; F02M 21/0209; Y10T 137/7922; Y10T 137/0379; Y10T 137/7837; F02D 19/0673; F02D 19/0678; F02D 19/0681; F02D 19/022; F17D 3/01; F16K 17/04; Y02T 10/32
USPC .......................... 123/506, 467–470; 417/540
See application file for complete search history.

(56) References Cited

U.S. PATENT DOCUMENTS

| | | | |
|---|---|---|---|
| 4,321,953 A | 3/1982 | Grothoff | |
| 4,373,872 A * | 2/1983 | Kemmner et al. | 417/312 |
| 5,067,467 A * | 11/1991 | Hill | F02B 23/0672 123/497 |
| 5,259,412 A | 11/1993 | Scott et al. | |
| 5,265,644 A * | 11/1993 | Tuckey | 137/510 |
| 5,297,578 A | 3/1994 | Scott et al. | |
| 5,477,829 A | 12/1995 | Hassinger et al. | |
| 5,540,208 A * | 7/1996 | Kikutani | F02B 43/00 123/518 |
| 5,660,602 A * | 8/1997 | Collier et al. | 48/127.3 |
| 7,007,708 B2 | 3/2006 | Burke et al. | |
| 7,401,593 B2 * | 7/2008 | Rembold et al. | 123/467 |
| 2004/0250871 A1 * | 12/2004 | Bingham | F17C 7/02 141/59 |
| 2005/0034710 A1 * | 2/2005 | Crary | F02M 33/08 123/457 |
| 2009/0183711 A1 * | 7/2009 | Akita | F02D 41/221 123/334 |
| 2009/0320937 A1 | 12/2009 | Arnett | |
| 2009/0320947 A1 | 12/2009 | Wan et al. | |

* cited by examiner

METHOD AND SYSTEM FOR CONTROLLING FLUID FLOW FROM A STORAGE TANK THROUGH A SUPPLY LINE TO AN END USER

CROSS-REFERENCE TO RELATED APPLICATION(S)

This application is a continuation-in-part of U.S. patent application Ser. No. 12/414,436, having a filing date of Mar. 30, 2009, entitled "Pressure Method And System For Controlling Fluid Flow From A Storage Tank Through A Supply Line To An End User". The '436 application is hereby incorporated by reference in its entirety.

FIELD OF THE INVENTION

The present invention relates to a method and a system for controlling fluid flow from a storage tank through a supply line to an end user

BACKGROUND OF THE INVENTION

This present method and system relate to the storage of fluid in a tank at a storage pressure higher than the atmospheric pressure and that deliver it through a fluid supply line to an end user, with the fluid delivered to the end user having a delivery pressure that is higher than the storage pressure. During normal operation, a device such as a pump or compressor is employed to increase the pressure of the fluid that is delivered to the end user. In this description, the term "pump" is used to describe a device that can be used to increase the pressure of a fluid. For example, if the fluid is stored as a gas, the term "pump" will be understood to include compressors.

In such systems, there can be times when the pressure in the fluid supply line is lower than the storage pressure, for example, when there is a break in the fluid supply line or when the system is being serviced. To allow for these circumstances, these systems are typically equipped with safeguards for stopping fluid from flowing from the storage tank to the fluid supply line. In known systems, these safeguards can add pressure losses to the fluid flowing from the storage tank to the end user, and the components required to provide such safeguards can add to the cost of the system. Improved safeguards would operate to stop flow from the storage tank to fluid supply line in appropriate circumstances while reducing the pressure losses at times when fluid is flowing from the storage tank to the end user. It would also be beneficial for the improved safeguards to reduce the complexity and cost of the system, for example, by requiring fewer components.

A fuel storage and delivery system for an internal combustion engine that is fuelled with a gaseous fuel, such as natural gas, is an example of an application that is particularly suited for the present system. The fuel is typically stored in a fuel tank at higher than atmospheric pressure and supplied to be combusted in the engine at pressures higher than the storage pressure. If natural gas fuel flows from the fuel tank into the engine system when there is a break in the fuel supply line, the fuel can escape, wasting fuel and polluting the atmosphere, so safeguards are desirable to guard against this from happening Safeguards are also desirable to prevent excessive pressures from building and damaging the delivery system.

Natural gas has been used to fuel vehicle engines for many years. The fuel supplied to a natural gas driven vehicle is stored either in a liquefied natural gas (LNG) tank or in a compressed natural gas (CNG) cylinder. LNG is normally stored in a cryogenic tank at low pressure, and provides a higher energy density compared to CNG Recent improvements to natural gas engine technology have made natural gas engines more efficient and more durable. In addition, as concern increases for protecting the environment, the ability of natural gas engines to pollute less than equivalent diesel- or gasoline-fuelled engines has also become more of a factor for engine buyers. Economically, businesses are also considering switching to natural gas as a fuel because it is more abundant than liquid petroleum fuels and, compared to these fuels, this is reflected in historically lower prices for an equivalent amount of natural gas, when measured on an energy basis. The foregoing factors favor switching to natural gas as a fuel for vehicles and, as a result, in recent years the number of natural gas fuelled vehicles has increased. Increased demand for natural gas engines has increased the importance for developing improved on-board fuel supply systems, including the parts of these systems that manage fuel pressure and provide safeguards during engine operation.

One way that natural gas fuelled engines have improved efficiency and reduced emissions has been by injecting the fuel directly into the combustion chambers after the compression stroke begins, instead of introducing the fuel into the intake air system at relatively low pressures; injecting the fuel directly into the combustion chamber in this manner requires a fuel supply system that can deliver the natural gas at a pressure of at least 3000 pounds per square inch gauge (psig) (20684.3 kilopascals (kPa)). With a requirement for such a high delivery pressure, it is impractical to build an LNG tank with an operating pressure that allows the fuel to be delivered directly to an engine without using a device such as a pump between the LNG tank and the engine for increasing the pressure of the fluid delivered to the engine. Similarly, it is also impractical to deliver natural gas directly from a CNG tank at such high pressures, because the storage pressure drops as soon as gas is withdrawn from a CNG tank, and once the pressure in the storage tank is lower than the required injection pressure, the storage tank needs to be filled, while there is a large amount of fuel still remaining in the storage tank. In both cases a pump or other device is required to raise the pressure of the fuel from the storage pressure to the injection pressure. The pump can be placed within the tank or disposed outside of the tank.

When the engine is operating, by way of example, the pump can receive fuel from the storage tank at a storage pressure of about 230 psig (1585.7 kPa) and raise the pressure of the fuel to an injection pressure that is at least 3000 psig (20684.3 kPa), and preferably around 4500 psig (31026.4 kPa). When the engine is shut down and the pump is not operating the pressure of the residual fuel in the supply line can be maintained at around 4500 psig (31026.4 kPa). If there are breaks in the system's plumbing or if there are open lines during the system's servicing, the pressure in the supply line can drop to a pressure that is below the storage pressure, and without proper safeguards, this can cause fuel to flow from the storage tank and into the supply line, causing loss of fuel and a release of fuel into the surrounding atmosphere.

In the past, a solution to this problem has been to use a manually actuated shut-off valve to isolate the storage tank from the supply line and the engine system when the engine is not operating. The disadvantage of such a system is that the operator has to manually actuate the shut-off valve upon engine shut-down. A human error could then result in fuel leaks into the atmosphere.

Another solution is to use a check valve that is normally open when the engine is operating and the supply line is filled with high pressure fuel, and that closes when the pressure in the system drops below a predetermined value. Check valves designed to work at high pressures introduce a large pressure drop into the system which is not desirable for system efficiency.

In another alternative, a solenoid valve could be implemented that is electrically actuated to stay open within a predetermined pressure range at high pressures. Existing solenoid valves are generally designed for operating at lower pressures. This approach also adds to the cost and complexity of the system.

Known shut off valves include diaphragm shut off valves. U.S. Pat. No. 3,763,840 describes such a shut off valve, which is placed between a storage tank and the supply line to a carburetor. The valve stays closed when the pump is not operating when the engine is shut-down, even if the pressure in the fuel tank increases, and it opens only when the pressure in the fuel supply line builds up. This prevents a pressure build-up in the fuel tank from forcing fuel through the fuel supply line to the carburetor and also allows fuel from the fuel supply line to bleed into the tank to prevent overpressure conditions in the supply line when the engine is shut down.

In another example, U.S. Pat. No. 7,007,708 describes an assembly of two valves that achieves the effect of at least partially stopping fluid flow between the pump and the engine system when the pump is not operating during engine shut-down situations, and allowing fluid flow from the system back to the pump only when the pressure in the system builds up.

Other known diaphragm shut-off valves, such as the ones described in U.S. Pat. Nos. 5,259,412 and 5,297,578, close when there is no negative pressure in the line connecting the engine to the tank which indicates that there is no fuel demand from the engine such as when the engine is shut down. These valves remain closed even when the pressure in the tank builds up.

Known shut-off valves do not address the problem of isolating the storage tank if there is a leak in the supply line plumbing when the engine is shut down.

Other existing solutions, such as systems that use manual valves, are inconvenient to operate and can introduce a potential for human error. Known check valves and diaphragm valves do not perform well at the high pressures required for delivering fuel at the requisite delivery pressure for directly injecting the fuel into the engine's combustion chambers. Systems that use solenoid valves require additional components, such as a controller, to actuate them. Furthermore, an important disadvantage of some of the existing valves is that they introduce a high pressure drop in the system during engine operation.

Therefore, in the type of systems described herein, it is necessary, or at least desirable, to automatically prevent fluid from draining from a pressurized storage tank when the system is shut down and there is a pressure in the supply line that is lower than the storage pressure. Accordingly, it would be beneficial to isolate the tank from the supply line and the end user, when the engine is shut-down and the pressure in the supply line is less than a predetermined upper limit of the storage pressure operating range. It is also desirable for the improved system to be simpler in construction compared to known systems, to reduce capital and maintenance costs and to make operation of the system simpler.

SUMMARY OF THE INVENTION

An improved method controls flow of fluid in a fluid supply line from a fluid storage tank to an end user. The method comprises:
(a) allowing fluid to flow within the fluid supply line from the fluid storage tank to the end user when a collective fluid pressure within the fluid supply line is greater than a predetermined set point, the collective fluid pressure resulting from fluid pressures on both sides of a valve acting in the same direction to exert an opening force on a valve member;
(b) stopping fluid flow through the fluid supply line when the collective fluid pressure within the fluid supply line on both sides of the valve is less than the predetermined set point; and
(c) introducing fluid to the end user by increasing pressure of the fluid to a delivery pressure.

The predetermined set point is selected to be less than the delivery pressure and greater than a predetermined upper limit of storage tank fluid pressure to prevent fluid from escaping from the fluid storage tank when fluid pressure in the fluid supply line is below the predetermined set point.

The method allows relieving pressure from the fluid supply line through a pressure relief valve in fluid communication with the fluid supply line between the valve and the end user.

In a preferred method the fluid tank stores a fuel and the end user is an internal combustion engine. A preferred fuel can be a gaseous fuel, such as natural gas. Other fuels can be hydrogen, propane, ethane, butane, methane and mixtures thereof.

An improved system controls flow of fluid from a fluid storage tank to an end user. The system comprises:
(a) a fluid supply line connecting the fluid storage tank to the end use;
(b) a valve disposed in the fluid supply line between the fluid storage tank and the end user, the valve actuatable by fluid pressure between an open position and a closed position, the valve actuated into an open position when a collective fluid pressure within the fluid supply line is greater than a predetermined set point, the collective fluid pressure resulting from fluid pressure on both sides of the valve acting in the same direction to exert an opening force on a valve member, the valve actuated into a closed position when the collective fluid pressure within the fluid supply line on both sides of the valve is less than the predetermined set point; and
(c) a pump disposed in the fluid supply line between the fluid storage tank and the valve, the pump receiving fluid from the fluid storage tank and increasing pressure of the fluid to a delivery pressure.

In operation, the predetermined set point is selected to be less than the delivery pressure and greater than a predetermined upper limit of a storage tank fluid pressure to prevent fluid from escaping from the fluid storage tank when fluid pressure in the fluid supply line is below the predetermined set point.

In some embodiments, the predetermined set point can be selected to be lower than a maximum pressure rating for the fluid supply line.

In these embodiments, the system further comprises a system pressure relief valve in fluid communication with the fluid supply line between the valve and the end user.

In a preferred embodiment, the fluid tank stores fuel and the end user is an internal combustion engine. In this embodiment, "fuel" is defined herein as a fluid that is combustible in the combustion chamber of an internal combustion engine. The preferred fuel can be a gaseous fuel such as, for example, natural gas. Other fuels can be hydrogen, propane, ethane, butane, methane, and mixtures thereof.

In preferred embodiments, the system for practicing the method is an engine system comprising:
  (a) a fuel storage tank defining a volume for storing a gaseous fuel at a storage pressure;
  (b) an internal combustion engine;
  (c) a fuel supply line fluidly connecting the fuel storage tank to the internal combustion engine;
  (d) a valve disposed in the fuel supply line between the fuel storage tank and the internal combustion engine, the valve actuatable by fluid pressure between an open position and a closed position, the valve actuated into an open position when a collective fluid pressure within the fuel supply line is greater than a predetermined set point, the collective pressure resulting from fluid pressure on both sides of the valve acting in the same direction to exert an opening force on a valve member, the valve actuated into a closed position when the collective fluid pressure within the fuel supply line on both sides of the valve is less than the predetermined set point; and
  (e) a pump disposed in the fuel supply line between the fuel storage tank and the valve, the pump receiving gaseous fuel from the fuel storage tank and increasing pressure of the gaseous fuel to a delivery pressure.

In operation, the predetermined set point is selected to be no greater than a predetermined upper limit of the fuel storage tank pressure.

The predetermined set point can be selected to be lower than a maximum pressure rating for the fluid supply line. In these embodiments, the engine system further comprises a system pressure relief valve in fluid communication with the fuel supply line between the valve and the internal combustion engine.

In preferred embodiments, the gaseous fuel is a combustible gas selected from the group consisting of natural gas, hydrogen, propane, ethane, butane, methane, and mixtures thereof.

The gaseous fuel can also be stored in liquefied form within the storage tank.

An advantage of the present method is that it involves a simple method for isolating a fluid storage tank by automatically stopping fluid flow from the fluid storage tank to the end user when the pressure in the fluid supply line drops below a predetermined set point, without relying upon action by an operator or additional control elements for actuating the valve. Another advantage is that the valve used in the system as illustrated does not introduce high pressure drops and works well in high pressure systems.

DETAILED DESCRIPTION OF PREFERRED EMBODIMENT(S)

Figure 1:
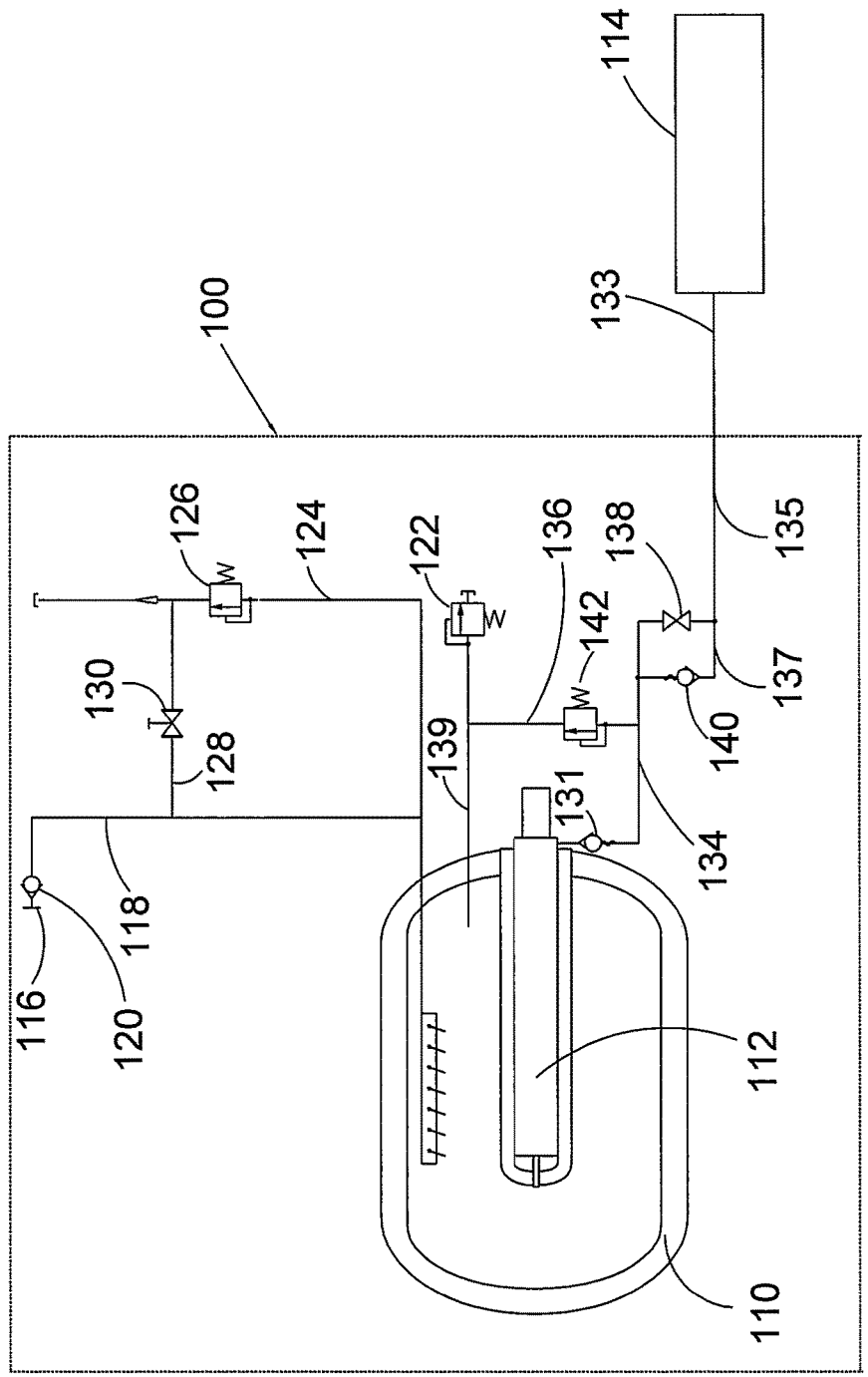
FIG. 1 is a schematic diagram of a fluid delivery system from the prior art using a manual shut-off valve in combination with a check valve for delivering fluid from a storage tank to an end user.

The present fluid delivery system comprises a valve that can isolate a storage tank from an end user, but that can also allow fluid flow through the fluid supply line to a pressure relief valve associated with the fluid supply line if the collective fluid pressure in the delivery system which exerts an opening force on a member in the valve is higher than a predetermined set point. The valve is mechanically biased in the closed position and it is operable between an open position and a closed position. When the collective fluid pressure in the delivery system drops below the predetermined set point the valve closes.

The valve described herein is different from known valves used in such systems in that it stays open as long as the collective fluid pressure in the delivery system on both sides of the valve is higher than the predetermined set point. That is, the valve is constructed so that fluid pressure on both sides of the valve can act in the same direction on the valve member to urge it towards an open position against the force exerted by an elastic element and the atmospheric pressure.

The system further comprises a pump disposed between the storage tank and the valve. The pump receives fluid from the storage tank and discharges it at the delivery pressure which is higher than the predetermined set point at which the valve opens. Therefore when the fluid in the supply line is at delivery pressure the valve is open.

Because in the present valve construction, the pressure in the supply line acts against the atmospheric pressure rather than the downstream pressure and because the open flow area through the valve when the valve member is in its open position is large enough, the pressure drop introduced by the fluid flowing through the valve is low compared to the pressure drop that is introduced by some of the other types of valves known to be used in such systems. When the system is shut down, the valve remains open as long as the collective fluid pressure within the valve acting on the valve member is greater than the predetermined set point. This allows fluid to flow to a pressure relief in communication with the supply line on one side of the valve associated with the supply line.

In some applications, under some circumstances, it is normal to keep high pressure fluid in the supply line so that the fluid is immediately available to the end user when the system is re-started. Under other circumstances, for example, if it is known that the system will be shut down for an extended time or if maintenance work is scheduled for the system, the fluid can be drained or vented from the supply line so that the storage pressure is higher than the pressure in the supply line; under these circumstances, fluid flow from the storage tank into the supply line should be avoided, as storage pressure is higher than the fluid pressure in the supply line. When the fluid pressure in the supply line between the valve and the end user is lower than a predetermined upper limit of the storage pressure operating range, the predetermined closing force acting on the valve member is greater than the opening force generated by the collective fluid pressure so that the valve remains closed, preventing fluid from flowing through the valve and out of the storage tank. In a preferred embodiment of the valve, the closing force is generated mechanically, for example, by a spring acting on the valve member.

In an application that is particularly suited to the present method and system, the fluid is a fuel and the end user is an internal combustion engine. The fuel, which is combusted by the internal combustion engine, can be a gaseous fuel such as natural gas, hydrogen, propane, ethane, butane, methane or blends of such gaseous fuels. Under some conditions, gaseous fuels can be harder to ignite than liquid fuels such as diesel. To ignite the gaseous fuel, the engine can employ techniques to assist with fuel ignition. For example, ignition can be assisted by a glow plug or other hot surface provided inside the combustion chamber, by a spark plug, or by the auto-ignition of a small amount of liquid fuel that acts as a pilot fuel. One of the illustrated embodiments shows an engine with a fuel delivery system that comprises a gaseous fuel delivery system and a pilot fuel delivery system.

To simplify the illustration of the system, in the accompanying figures, some components are not shown. Persons familiar with the technology involve here will recognize that the present system also includes additional components, such as, for example, sensors, control valves on the storage tank supply line, components for preventing pressure fluctuations in the system caused by the fluid supply pump, such as accumulators and associated components, and venting lines for the end user.

Referring to the drawings, FIG. 1 is a schematic illustration of a fluid delivery system 100 as known from the prior art which comprises storage tank 110 and pump 112, which delivers fluid from the storage tank to end user 114. When the fluid is stored in liquefied form at cryogenic temperatures, pump 112 preferably comprises an integrated heater module, as described in co-owned Canadian Patent No. 2,362,881, issued on Jan. 27, 2004, for warming the fluid and vaporizing it before it is discharged into first section 134 of the supply line.

Storage tank 110 stores a fluid at a storage pressure, which in this system is a relatively low pressure, compared to the pressure of the fluid that is delivered to end user 114. The pump can be employed to receive fluid from the storage tank where it is held at a storage pressure, and when the end user needs or desires fluid to be introduced to it, the pump is started to increase fluid pressure to a delivery pressure that is higher than the storage pressure. Pump 112 is disposed within storage tank 110 with its inlet immersed in the fluid stored in storage tank 110, but the pump need not be as shown. The pump can be located outside the tank, with a suction line that fluidly connects the storage volume of the tank with the pump inlet.

Storage tank 110 is filled from fill inlet 116 through fill line 118, which is equipped with check valve 120 to allow fluid flow only in the direction from fill inlet 116 to storage tank 110. Storage tank 110 is also connected to primary tank relief valve 122, and also to vent line 124 through secondary tank relief valve 126. Primary tank relief valve 122 can communicate with the storage volume as shown in FIG. 1, so that fluid vents out of the tank when the pressure within the tank exceeds a predetermined maximum operating pressure. Secondary tank relief valve 126 also vents fluid out of the tank when the pressure inside the tank exceeds a maximum operating pressure. As a safety measure, the pressure for opening relief valves 122 and 126 and venting from the tank is set to be lower than the maximum pressure rating for storage tank 110, which is the maximum storage pressure for which the tank is designed. Fill line 118 and vent line 124 can be fluidly connected through line 128, which can be opened or closed by operation of valve 130. When valve 130 is open, storage tank 110 can be vented through fill line 118, line 128 and vent line 124 which in some cases is preferred to venting directly through vent line 124 or through return line 139.

Fluid from storage tank 110 is delivered to end user 114 through pump 112 and fluid supply line 133 comprising a first section 134 and a second section 135 which are connected in series and divided by manual shut-off valve 138. Manual shut-off valve 138 is normally open when fluid is being delivered to end user 114, but manual shut-off valve 138 is closed when the system is shut down to prevent fluid flow from storage tank 110 through pump 112 into second section 135 of the fluid supply line, where it might escape from the system if there are breaks in second section 135 of the fluid supply line or leaks in the connections between system components.

Over-pressure check valve 140 is connected in parallel to manual shut-off valve 138 on line 137 to allow fluid trapped in fluid supply line 135 to flow back into first section 134 of the supply line, by-passing closed manual shut-off valve 138, but this arrangement then requires supply line relief valve 142, which is in fluid communication with first section 134 of the supply line, to allow fluid to flow back into storage tank 110 through return lines 136 and 139. Without supply line relief valve 142 and return lines 136 and 139, with the prior art arrangement shown in FIG. 1, when the system is shut down and manual shut-off valve 138 is closed, fluid held in first section 134 and second section 135 of the supply line would be otherwise trapped therein because fluid can not flow back to storage tank 110 through first section 134 of the supply line because of check valve 131.

Accordingly, disadvantages of the prior art system shown in FIG. 1 include the system operator having to remember to actuate manual shut-off valve 138 when the system is shut down. Also, over-pressure check valve 140 is necessary or desirable to allow fluid held in second section 135 of the fluid supply line to flow past closed shut-off valve 138 and be vented through supply line relief valve 142.

Manual shut-off valve 138 could be replaced with a solenoid valve or a check valve that automatically closes when the system is shut-down, but check valves introduce pressure losses to the system, and it is still necessary to provide fluid communication between second section 135 and first section 134 of the supply line and storage tank 110 through over-pressure check valve 140 and supply line pressure relief valve 142.

Figure 2:
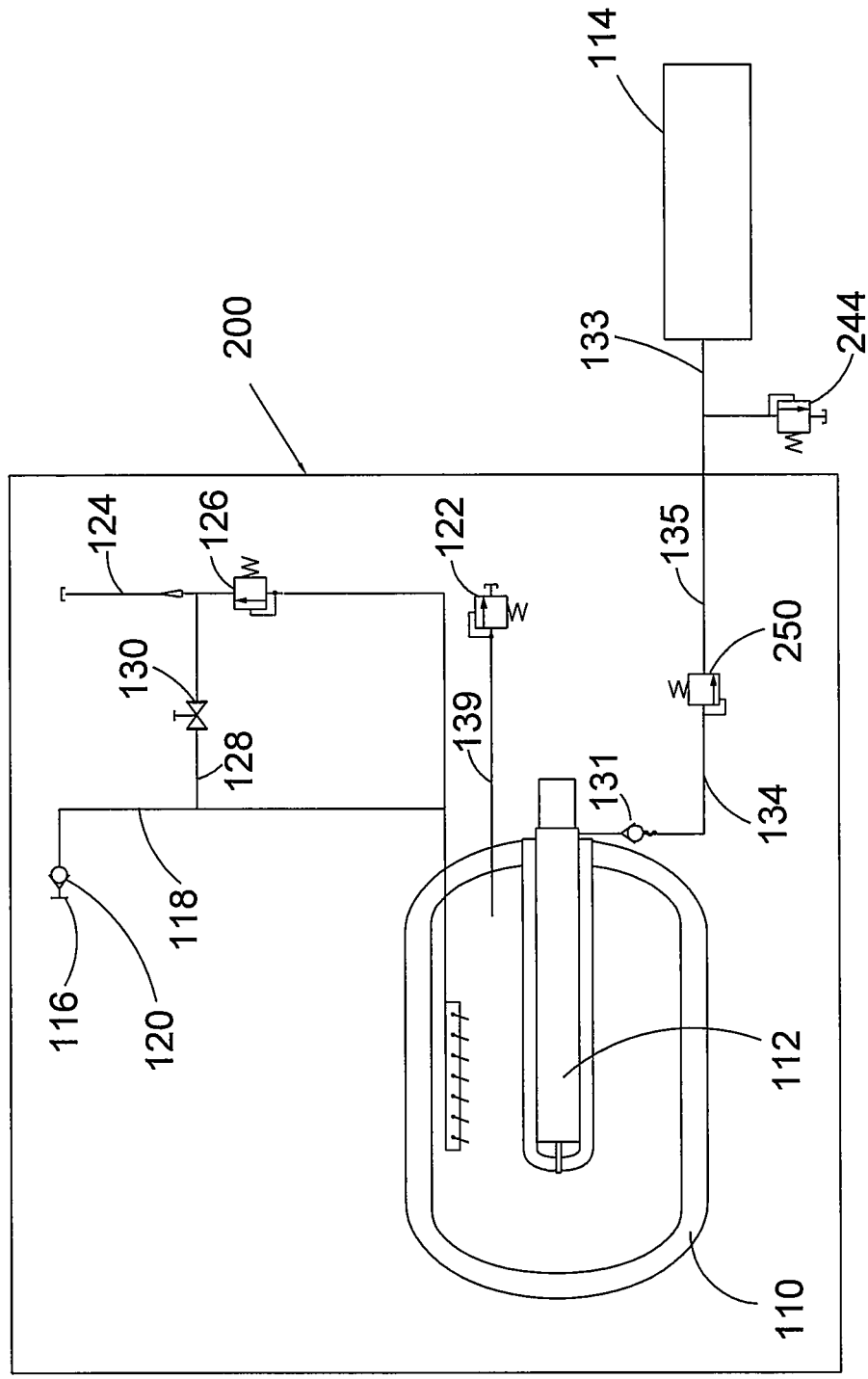
FIG. 2 is a schematic diagram of a fluid delivery system using a valve according to the present technique for isolating a storage tank from an end user when the end user is not operating.

An improved arrangement for controlling fluid communication between a storage tank and an end user according to the present method and system is illustrated in FIG. 2. This system has many components that are equivalent to like components of the prior art system shown in FIG. 1 and like components are identified by like reference numbers. Persons familiar with the technology involved here will recognize that, in this description, like-numbered components function in substantially the same way in each embodiment. Accordingly, if like components have already been described with respect to the prior art or one of the present embodiments, the purpose and function of such like components may not be repeated in relation to each of the illustrated embodiments.

Fluid delivery system 200 comprises tank 110 and associated pump 112 for raising the pressure of fluid stored in the tank to a delivery pressure. The system further comprises end user 114 in fluid communication with the storage tank through fluid supply line 133 comprising first section 134 and second section 135. The delivery pressure can reach high values as required by the end user, and under normal operating conditions delivery pressure is much higher than the storage pressure in storage tank 110. Persons familiar with the technology involved here will recognize that pump 112 can be piston pump, a rotary pump, a compressor, or other device that works efficiently with the fluid used in the system. Pump 112 can be placed inside the tank or outside of the tank and it has an inlet that is in fluid communication with the storage volume defined by storage tank 110.

First section 134 and second section 135 of fluid supply line 133 are connected in series and separated by valve 250, with first section 134 of the fluid supply line in fluid communication with the discharge of pump 112 and second section 135 of the fluid supply line in fluid communication with end user 114. Different constructions can be used for valve 250, but it is characterized by being a valve that allows flow from first section 134 of the fluid supply line to second section 135 of the fluid supply line when fluid is being delivered to end user 114 or when there is a need to release fluid through system pressure relief valve 244. Valve 250 is further characterized by being biased in the closed position when fluid pressure in first section 135 of the fluid supply line is lower than a predetermined upper limit of the storage pressure operating range.

Figure 3:
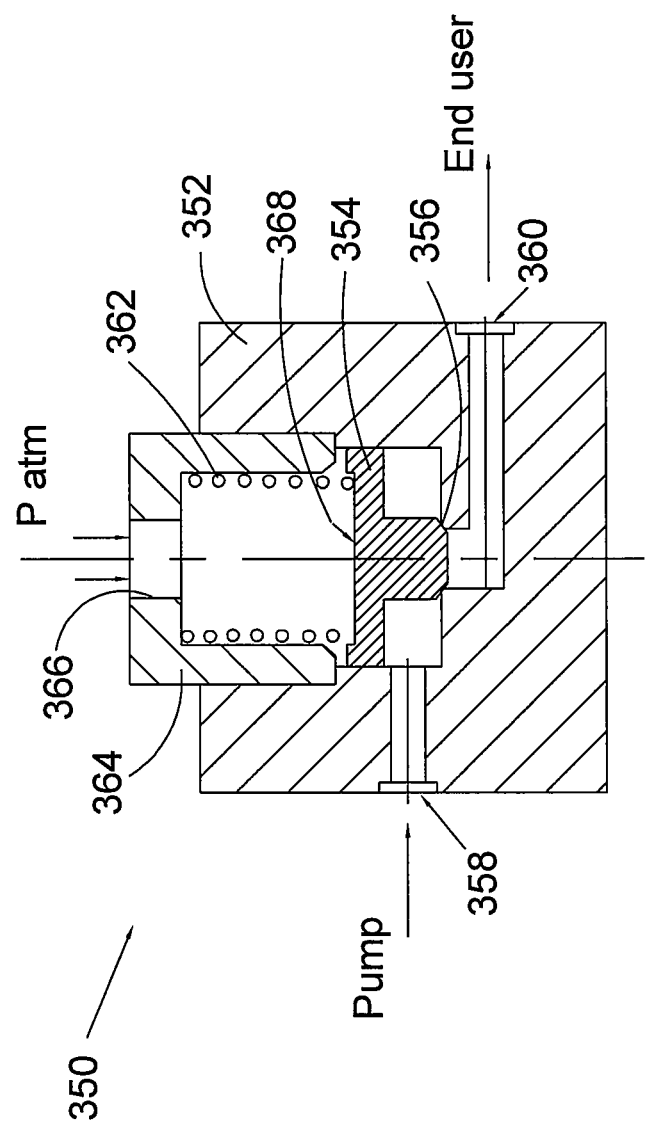
FIG. 3 is a schematic section view of an example of a valve that can be used for isolating the tank from the end user as illustrated in FIG. 2.

Valve 250 can be a solenoid valve that is actuated in response to measured pressure within second section 135 of the fluid supply line, but in preferred embodiments valve 250 has a valve member that is mechanically biased in the closed position but that is movable to an open position when an opening force generated by the collective fluid pressure acting on the valve member is greater than the mechanically generated closing force. When closed, valve 250 isolates storage tank 110 from second section 135 of the fluid supply line and end user 114, and prevents fluid from flowing out of storage tank 110. In preferred embodiments, valve 250 has a simple construction and is configured so that when it is open it does not introduce a high pressure loss to the fuel supply line. An example of such a valve is illustrated in FIG. 3 and will be explained in further detail below.

The predetermined pressure set point at which valve 250 closes is selected so that valve 250 stays closed until the collective fluid pressure which is the result of fluid pressures on both sides of the valve acting in the same direction on the valve member to open the valve is higher than a predetermined upper limit of the storage pressure operating range to prevent fluid leakage from the tank even if the pressure inside the tank fluctuates. Accordingly, the predetermined set point for opening valve 250 is determined based on a predetermined upper limit of the storage pressure operating range plus a margin of error that takes into consideration the pressure fluctuations inside the tank. One of the advantages of the improved system illustrated in FIG. 2 over the prior art system illustrated in FIG. 1 is that valve 250 is designed to stay open when end user 114 is shut down as long as fluid pressure is maintained in first and second sections 134 and 135 of the fluid supply line so that the collective fluid pressure which is the result of fluid pressures on both sides of the valve acting in the same direction generates an opening force acting on the valve member that exceeds the closing force. Open valve 250 maintains fluid communication between first section 134 of the fluid supply line and second section 135 of the fluid supply line so that fluid can be released through system pressure relief valve 244 if fluid pressure in fluid supply line 133 exceeds the predetermined set point for opening system pressure relief valve 244. The predetermined set point for opening system pressure relief valve 244 is the maximum pressure rating for fuel supply line 133 which comprises sections 134 and 135 and it is generally higher than the upper limit of the storage pressure in the tank.

Further explanation is now provided for greater understanding of the present system shown in FIG. 2, and the method of operating it to control fluid flow between storage tank 110 and end user 114. When end user 114 is started, pump 112 starts supplying fluid from storage tank 110 to end user 114 through fluid supply line 133. When pump 112 is operating, fluid pressure in first and second sections 134 and 135 of fluid supply line 133 is higher than the predetermined upper limit of the storage pressure operating range in tank 110. Valve 250 is open allowing fluid flow from storage tank 110 to end user 114.

When end user 114 is shut down and pump 112 stops, the pressure within fluid supply lines 134 and 135 stays high, at values around the delivery pressure. Valve 250 stays open when end user 114 is operating and also when end user 114 is shut down because the pressure in the fluid supply line is higher than its set closing pressure. If there is a leak in second section 135 of the fluid supply line, the fluid pressure in both fluid supply line sections 134 and 135 drops quickly because the leak connects them to atmospheric pressure. When the pressure in fuel supply line sections 134 and 135 drops below the set closing pressure, valve 250 closes stopping fluid flow into second section 135 of the fluid supply line and further loss of fluid through the leak.

The predetermined set point for actuating valve 250 can be selected to be lower than the maximum pressure rating for fuel supply line 133 to avoid closing valve 250 if the pressure within the supply line fluctuates towards the maximum pressure rating. By keeping valve 250 open in this situation, damage to the supply line can be avoided. The maximum pressure rating for the fuel supply line is higher than the upper limit of the storage pressure operating range.

Shown in FIG. 3 is valve 350 which is an illustrative example of the type of valve that can be used in the location of valve 250 shown in FIG. 2. Valve 350 comprises housing 352 and can comprise a valve member, more specifically piston 354 which rests on seat 356 when regulator valve 350 is in its closed position. When piston 354 is seated it closes fluid communication between first opening 358 which can be connected to first section 134 of the fluid supply line and pump 112, and second opening 360 which can be connected second section 135 of the fluid supply line and to end user 114. Piston 354 is biased towards seat 356 by spring 362 which is housed in lid 364. Lid 364 comprises opening 366 and in this embodiment only atmospheric pressure acts on upper surface 368 of piston 354 so that the closing force acting on piston 354 is the sum of atmospheric pressure and the mechanical force generated by spring 362. The magnitude of the closing force generated by spring 362 is selected such that the sum of the closing forces is higher than the predetermined upper limit of the storage pressure operating range within storage tank 110 by a predetermined margin, so that fluid does not leak out of storage tank 110 when the fluid pressure in second portion 135 of the fluid supply line drops to below the predetermined upper limit of the storage pressure operating range.

If deployed in the position of valve 250 shown in FIG. 2, valve 350 in its open position allows fluid flow between first opening 358 and second opening 360 even at times when end user 114 is shut down and pump 112 is not operating. The pressure in first section 134 of the fluid supply line can remain around the operating pressure after end user 114 is shut down. If there is a break or a leak in second section 135 of the fluid supply line or end user 144, fluid pressure in fluid supply line 133 will drop below the set closing pressure for valve 350. With the closing force generated by spring 362 and the atmospheric pressure acting on upper surface 368 of piston 354 now greater than the opening force, piston 354 is pushed into its seated position against seat 356, thereby stopping fluid flow between first opening 358 and second opening 360.

The valve illustrated in FIG. 3 is an example of a valve which substantially eliminates the pressure drop between first opening 358 and second opening 360 because of the relatively low closing force applied to piston 354 for seating it against seat 356 and because the fluid passages through valve 350 can be designed so that they do not restrict fluid flow, which can be another feature for reducing pressure drops for fluid flowing through the fluid supply line. Valve 350 is provided as an illustrative example and other valve designs can be used to achieve the same function and result described herein without departing from the scope of the present disclosure.

Figure 4:
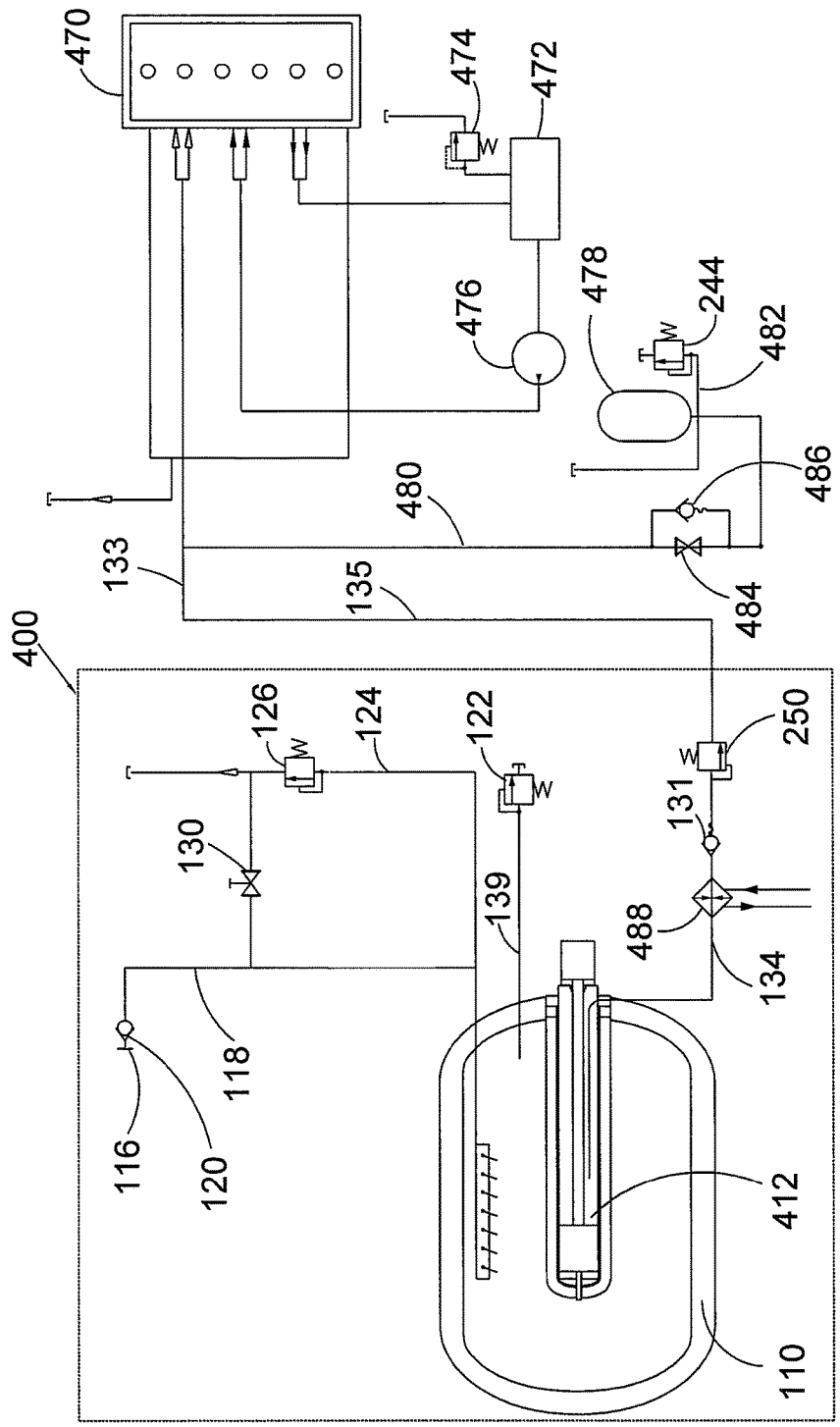
FIG. 4 shows a schematic diagram of a fuel delivery system using a valve according to the present technique for isolating an LNG tank from a natural gas powered internal combustion engine.

FIG. 4 shows another embodiment of the present system for controlling fluid flow from a storage tank to an end user. FIG. 4 shows the present system applied to a gaseous fuel delivery system for an internal combustion engine, wherein the gaseous fuel can be stored at cryogenic temperatures in liquefied form. This system has many components that are equivalent to like components of the systems presented in FIGS. 1 and 2 and like components are identified by like reference numbers.

Fluid delivery system 400 comprises storage tank 110, which is a double-walled vacuum insulated storage tank for holding liquefied gas at cryogenic temperatures. Cryogenic piston pump 412 has a suction inlet immersed in the liquefied gas held inside storage tank 110 and a heater can be integrated with the pump assembly to receive the pumped liquefied gas from pump 112 and convert it to a high pressure gas which is discharged into fluid supply line 134.

In the embodiment illustrated in FIG. 4, the pump assembly is not equipped with an internal heater and the fuel that is delivered by pump 412 is vaporized in external heat exchanger 488 before being delivered through supply line 133 to engine 470. Fluid supply line 133, comprising first section 134 and second section 135 fluidly connected in series and divided by valve 250, delivers the high pressure gaseous fuel to internal combustion engine 470.

In preferred embodiments, pump 412 is a piston pump but it can also be another type of pump that can provide the fuel to the engine at the required injection pressure. In other embodiments (not shown), the pump can be placed outside storage tank 110 with a thermally insulated suction line extending from storage tank 110 to the suction inlet of the pump. Storage tank 110 holds the liquefied gaseous fuel that is combusted by the internal combustion engine.

In a preferred embodiment the gaseous fuel is natural gas, but the system can be used with other gaseous fuels such as hydrogen, propane, ethane, butane, methane or mixtures thereof. In the illustrated embodiment the internal combustion engine uses pilot fuel to assist with ignition of the gaseous fuel inside the engine's combustion chambers. The gaseous fuel system illustrated in FIG. 4 is equipped with a liquid fuel system for using a liquid pilot fuel such as diesel, dimethylether, or other fuels with a cetane number greater than 38, as the pilot fuel for igniting the natural gas.

Pilot fuel can be stored in pilot fuel storage tank 472 which is provided with pilot fuel pressure relief valve 474 and pilot fuel pump 476 which pumps pilot fuel from tank 472 to engine 470. In fuel injection systems that use a single injection valve for injecting both the gaseous fuel and the pilot fuel it can be desirable to keep the pressure differential between the two fuels within a predetermined margin to reduce the leakage of one fuel into the other fuel. Accordingly, in such systems the pressure of the gaseous fuel is linked to the pressure of the pilot fuel so fluctuations in pilot fuel pressure caused by operation of pump 472 can cause pressure fluctuations in the gaseous fuel supplied to engine 470.

Accumulator 478 can be used to store gaseous fuel under pressure to provide sufficient quantity of gaseous fuel to engine 470. Accumulator 478 is connected to branch line 480, which is connected to supply line 133.

In this embodiment system pressure relief valve 244 is placed on vent line 482 connected to branch line 480 such that it can relieve the overpressure in the system caused by the overpressure in fuel supply line 133 or accumulator 478. Branch line 480 is provided with secondary manual shut-off valve 484 that is closed when the engine is not operating and with secondary check valve 486. System pressure relief valve 244 fluidly communicates with sections 134 and 135 of fuel supply line 133 even when the internal combustion engine is shut down through open valve 250 and secondary check valve 486.

The system for controlling fluid flow from storage tank 110 to engine 470 operates in a similar way to the embodiment illustrated in FIG. 2. When engine 470 is running, pump 112 raises the pressure of the fuel supplied from storage tank 110 to an operating pressure and delivers the fuel to internal combustion engine 470 through fuel supply line 133 at a higher pressure than the pressure at which fuel is stored inside storage tank 110. Fuel supply line 133 comprises a first section 134 and a second section 135 connected in series and separated by valve 250. In a natural gas powered internal combustion engine natural gas is injected directly into the cylinders of the engine at injection pressures high enough to overcome the in-cylinder pressure and to introduce the desired amount of fuel. This manner of injecting fuel achieves combustion efficiencies similar to that of conventional diesel engines but with the added benefit of reduced emissions. The operating pressure of such a fuel delivery system is generally over 3000 psig (20684.3 kPa), and preferably around 4500 psig (31026.4 kPa), but this is still lower than typical injection pressures for conventional diesel engines which can use higher injection pressure to help with atomizing the liquid fuel.

With the present system, when the gaseous fuel is stored in liquefied form, it is stored at cryogenic temperatures at a storage pressure lower than around 230 psig (1585.7 kPa). When valve 250 is open, it allows fluid flow from storage tank 110 to engine 470. When engine 470 is shut down and pump 412 stops, the pressure within fluid supply line 133 can remain close to the operating pressure of 4500 psig (31026.4 kPa), and in this situation, valve 250 stays open because the fluid pressure in first and second sections 134 and 135 of the fluid supply line is higher than the set closing pressure for valve 250.

The set point for closing valve 250 can be, for example, around 350 psig (2413.2 kPa), which is higher than the predetermined upper limit of the storage pressure operating range which is generally around 230 psig (1585.7 kPa). If there is a leak in the fuel supply system between valve 250 and engine 470, the pressure in fluid supply line 133 drops quickly.

When the collective pressure acting on the valve member of valve 250 drops below the predetermined set point for closing the valve, valve 250 closes, stopping fluid flow from storage tank 110 to engine 470 and thereby preventing fluid leakage from storage tank 110.

The set point for closing valve 250 can be lower than the maximum pressure rating for sections 134 and 135 of fuel supply line 133, which can be, for example, around 400 psig (2757.9 kPa) such that when the pressure within the supply line fluctuates towards the maximum pressure rating valve 250 can open to allow a small amount of fluid to drain from the supply line until the pressure in sections 134 and 135 drops below the set point, to prevent the fluid supply line from being overpressurized.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for controlling flow of fluid in a fluid supply line from a fluid storage tank which stores fluid at a storage pressure higher than atmospheric pressure to an end user comprising:
    (a) allowing fluid to flow within said fluid supply line from said fluid storage tank, through a valve disposed on said fluid supply line, to said end user when a collective fluid pressure within said fluid supply line is greater than a set point corresponding to a predetermined closing force acting on an upper surface of a valve member of the valve, said collective fluid pressure resulting from fluid pressures at a first opening and a second opening of the valve acting in the same direction to exert an opening force on a side opposite the upper surface of the valve member to actuate said valve member to an open position;
    (b) stopping fluid flow through said fluid supply line when said collective fluid pressure within said fluid supply line at said first opening and said second opening of said valve is less than said set point;
    (c) preventing fluid within the supply line on the end user side of said valve from flowing back to said fluid storage tank; and
    (d) increasing pressure of said fluid to a delivery pressure suitable for operating said end user,
    wherein said set point is selected such that said valve is actuated to said open position when said collective fluid pressure is at a pressure that is less than said delivery pressure and greater than a predetermined upper limit of storage tank pressure operating range to prevent fluid from escaping from said fluid storage tank when fluid pressure in said fluid supply line is below said set point.

2. The method of claim 1 wherein said set point is selected to be lower than a maximum pressure rating for said fluid supply line.

3. The method of claim 1 further comprising relieving pressure from the fluid supply line through a pressure relief valve in fluid communication with the fluid supply line between said valve and said end user.

4. The method of claim 1 wherein said fluid storage tank stores a fuel.

5. The method of claim 4 wherein said end user is an internal combustion engine.

6. The method of claim 4 wherein said fuel is gaseous fuel.

7. The method of claim 6 wherein said gaseous fuel is natural gas.

8. A system for controlling flow of fluid from a fluid storage tank which stores fluid at a storage pressure higher than atmospheric pressure to an end user comprising:
    (a) a fluid supply line connecting said fluid storage tank to said end user;
    (b) a valve disposed in said fluid supply line between said fluid storage tank and said end user, said valve actuatable by fluid pressure between an open position and a closed position, said valve actuated into an open position when a collective fluid pressure within said fluid supply line is greater than a set point corresponding to a predetermined closing force acting on an upper surface of a valve member of the valve, said collective fluid pressure resulting from fluid pressure at a first opening and a second opening of said valve acting in the same direction to exert an opening force on a side opposite the upper surface of the valve member to actuate said valve member to an open position, said valve actuated into a closed position when said collective fluid pressure within said fluid supply line at said first opening and said second opening of said valve is less than said set point;
    (c) a second valve disposed between said valve and said fluid storage tank to prevent fluid within the supply line on the end user side of said second valve from flowing back to said fluid storage tank; and
    (d) a pump disposed in said fluid supply line between said fluid storage tank and said valve, said pump receiving fluid from said fluid storage tank and increasing pressure of said fluid to a delivery pressure suitable for operating said end user,
    wherein said set point is selected such that said valve is actuated to said open position when said collective fluid pressure is at a pressure that is less than said delivery pressure and greater than a predetermined upper limit of a storage tank pressure operating range to prevent fluid from escaping from said fluid storage tank when fluid pressure in said fluid supply line is below said set point.

9. The system of claim 8 wherein said set point is selected to be lower than a maximum pressure rating for said fluid supply line.

10. The system of claim 8 further comprising a pressure relief valve in fluid communication with said fluid supply line between said valve and said end user.

11. The system of claim 8 wherein said fluid storage tank stores a fuel.

12. The system of claim 11 wherein said end user is an internal combustion engine.

13. The system of claim 11 wherein said fuel is a gaseous fuel.

14. An engine system comprising:
    (a) a fuel storage tank defining a volume for storing a gaseous fuel at a storage pressure higher than atmospheric pressure;
    (b) an internal combustion engine;
    (c) a fuel supply line fluidly connecting said fuel storage tank to said internal combustion engine;
    (d) a valve disposed in said fuel supply line between said fuel storage tank and said internal combustion engine, said valve actuatable by fluid pressure between an open position and a closed position, said valve actuated into an open position when a collective fluid pressure within said fuel supply line is greater than a set point corresponding to a predetermined closing force acting on an upper surface of a valve member of the valve, said collective pressure resulting from fluid pressure at a first opening and a second opening of said valve acting in the same direction to exert an opening force on a side opposite the upper surface of the valve member to actuate said valve member to an open position, said valve actuated into a closed position when said collective fluid pressure within said fuel supply line at said first opening and said second opening of said valve is less than said set point;

(e) a second valve disposed between said valve and said fluid storage tank to prevent fluid within the supply line on the end user side of said second valve from flowing back to said fluid storage tank; and (f) a pump disposed in said fuel supply line between said fuel storage tank and said valve, said pump receiving gaseous fuel from said fuel storage tank and increasing pressure of said gaseous fuel to a delivery pressure suitable for operating said engine, wherein said set point is selected such that said valve is actuated to said open position when said collective fluid pressure is at a pressure that is an order of magnitude less than said delivery pressure and greater than a predetermined upper limit of said fuel storage tank pressure.

15. The engine system of claim 14 wherein said set point is selected to be lower than a maximum pressure rating for said fluid supply line.

16. The engine system of claim 14 further comprising a system pressure relief valve in fluid communication with said fuel supply line between said valve and said internal combustion engine.

17. The engine system of claim 14 wherein said gaseous fuel is a combustible gas selected from the group consisting of natural gas, hydrogen, propane, ethane, butane, methane, and mixtures thereof.

18. The engine system of claim 14 wherein said gaseous fuel is storable in liquefied form within said fuel storage tank.

19. The method of claim 1 wherein said set point is independent of an operating state of the end user.

20. The method of claim 1 wherein said closing force is generated mechanically.

* * * * *